United States Patent [19]

Wells et al.

[11] Patent Number: 4,977,985

[45] Date of Patent: Dec. 18, 1990

[54] METHOD OF CARRYING OUT MAINTENACE OF MULTI-DISC BRAKE ARRANGEMENT

[75] Inventors: Trevor C. Wells, Leamington Spa; Anthony J. Waring, Nuneaton, both of England

[73] Assignee: Dunlop Limited a British Company, United Kingdom

[21] Appl. No.: 360,159

[22] Filed: Jun. 1, 1989

[30] Foreign Application Priority Data

Jun. 8, 1988 [GB] United Kingdom ............... 8813518

[51] Int. Cl.⁵ ........................................ F16D 55/36
[52] U.S. Cl. .................................. 188/71.1; 188/71.5; 188/71.7; 188/196 R; 188/250 B; 188/196 M
[58] Field of Search ................. 188/71.5, 71.1, 71.7, 188/72.4, 73.32, 73.33, 196 R, 196 M, 250 B, 73.1, 218 XL; 192/70.2, 111 R, 70.13

[56] References Cited

U.S. PATENT DOCUMENTS

| 1,859,280 | 5/1932 | Corbin, Jr. . |
| 3,021,932 | 2/1962 | Becknell . |
| 3,480,115 | 11/1969 | Lallemant . |
| 3,494,452 | 2/1970 | Finkin . |
| 3,712,427 | 1/1973 | Cook et al. .............. 188/218 XL X |
| 4,023,654 | 5/1977 | Winzeler . |
| 4,613,017 | 9/1986 | Bok ........................... 188/250 B X |

FOREIGN PATENT DOCUMENTS

| 2365059 | 4/1978 | France . |
| 1201370 | 9/1970 | United Kingdom . |
| 1588623 | 4/1981 | United Kingdom . |
| 2161227 | 1/1986 | United Kingdom . |

OTHER PUBLICATIONS

European Search Report, Application No. EP 89 30 5686, date of completion of search 22-08-1989.

*Primary Examiner*—Douglas C. Butler
*Attorney, Agent, or Firm*—Stevens, Davis, Miller & Mosher

[57] ABSTRACT

A multi-disc brake suitable for an aircraft has a stack of rotor and stator discs in which the discs of a set at one end of the stack each have a greater allowance for wear than the discs of a set at the other end of the stack whereby the group of discs are removed together from one end of the stack as a fully worn group at a brake servicing operation. An unworn group of discs is added to the other end of the stack.

6 Claims, 1 Drawing Sheet

METHOD OF CARRYING OUT MAINTENACE OF MULTI-DISC BRAKE ARRANGEMENT

This invention relates to multi-disc brakes, such as are used in aircraft brake systems.

In recent years the rotor and stator discs for aircraft brakes increasingly have been made from carbon-carbon composite material, this material providing both the frictional surfaces of the discs and their structural integrity. The rotor discs are formed with slots at their outer peripheries to receive drive keys attached to the aircraft wheel, and the stator discs are correspondingly slotted at their inner peripheries to engage splines on a stationary torque tube.

In order to provide allowance for wear of the braking surfaces, the initial thicknesses of the discs have to be greater than may be required by their structural function in transmitting torque from their respective keys or splines. Thus the axial length, and weight, of the disc stack is initially greater than the optimum.

Further, in normal practice discs of a given type (i.e. rotors, single stators or double stators) are all worn concurrently from their original thickness to their fully worn thickness, which means that the initial size of a brake may be unnecessarily large.

One object of the present invention is to provide a multi-disc carbon brake which may be more economically operated, and a second object is to enable such a brake to be made lighter and more compact than conventional brakes of similar performance and the same expected disc wear life.

According to the invention, a multi-disc brake comprises a stack of interleaved rotor and stator discs arranged about a common axis, a thrust device provided at one end of the stack and a reaction member at the other end to create axial brake-applying pressure on the stack in operation of the thrust device and thereby generate friction between rubbing faces of adjacent rotor and stator discs wherein the discs are arranged so that the wear allowance of a set of discs at one end of the stack is greater than the wear allowance of a set of discs at the other end of the stack, whereby during a brake service operation following wear a fully worn group of discs may be removed from the said other end and the remaining discs may be moved axially to a new position towards said other end of the stack, an unworn group of discs being added at the said one end of the stack.

Preferably, the arrangement is such that upon replacement of worn discs the remaining discs in the stack are maintained in mutual relationship so that partly worn mating faces of adjacent discs remain in contact throughout their entire wear lives.

The invention is based upon the concept that by increasing the wear allowance of the discs progressively from one end of the stack to the other it is possible to operate a schedule of maintenance in which certain discs may be moved progressively through the stack, sustaining wear at different positions, and becoming fully worn in a position at or adjacent the other end. In practice, the two end discs of an aircraft brake are single stators, i e they do not rotate about the axis with the wheel and are worn on one side face only, the other side face either being in contact with a hydraulic thrust or reaction member for this reason, it is not normally practicable to replace a 'group' consisting of a single stator disc, and the minimum group size is therefore normally two discs, a rotor disc and a stator disc.

One embodiment of the invention will now be described, by way of example, with reference to the accompanying drawings in which.

Figure 1:
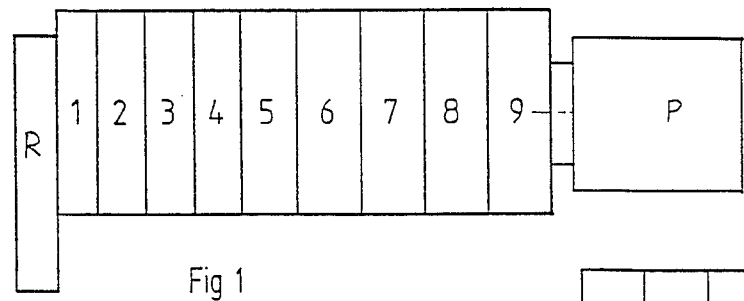
FIG. 1 is a diagrammatic axial cross-section showing part of an aircraft brake assembly in its initial unworn state comprising a piston assembly P, a reaction plate R, and a stack of interleaved stator and rotor discs 1–9.
Figure 2:
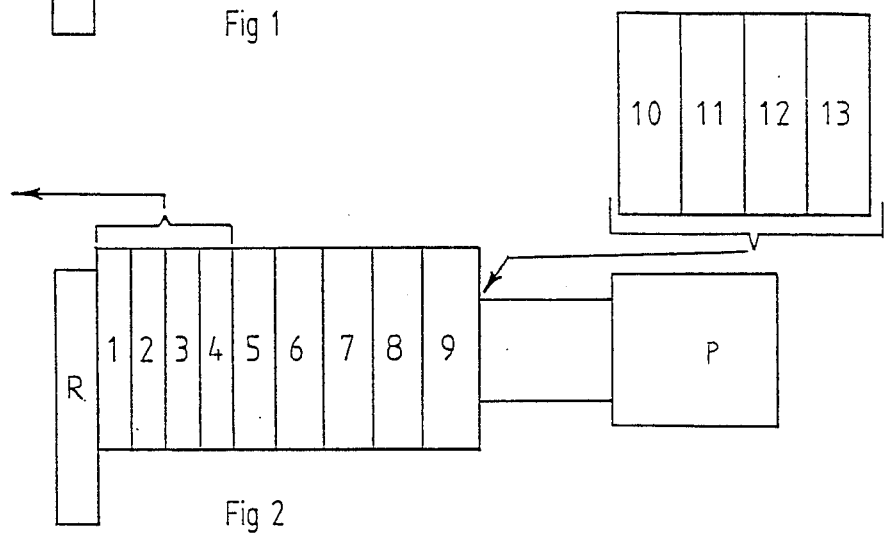
FIG. 2 is a similar view to FIG. 1 showing the brake in a worn condition prior to a service operation.

In the example illustrated in the drawings, carbon-carbon composite discs 1–9 as shown in FIG. 1 are made with wear allowances as follows (where t is the normal wear allowance per wear face during a service period after which the disc position will be changed within the stack or the disc will be removed from the brake and where s, r, and d are the final thicknesses of the single stators, rotors, and double stators respectively which are greater than or equal to the thicknesses necessary to carry the torque loadings applied to the discs when the discs are in the fully worn state.

| Disc | Original Disc Function | Total Wear Allowance Required | Thickness after First Wear Period |
|---|---|---|---|
| 1 | single stator | $1 \times t$ | s |
| 2 | rotor | $2 \times t$ | r |
| 3 | double stator | $2 \times t$ | d |
| 4 | rotor | $2 \times t$ | r |
| 5 | double stator | $3 \times t$ | s + t |
| 6 | rotor | $4 \times t$ | r + 2t |
| 7 | double stator | $4 \times t$ | d + 2t |
| 8 | rotor | $4 \times t$ | r + 2t |
| 9 | single stator | $4 \times t$ | s + 3t |

The above example assumes that the wear allowances are equal for rotors and stators.

A brake which is initially assembled with disc wear allowances as indicated in the above table is intended to be run in service until all of the wear allowances of the group comprising discs 1–4 have been used (this will normally occur simultaneously for all of discs 1–4 as designed in accordance with the table).

Discs 1–4 will then be removed as fully worn, and discs 5–9 moved along the axle to occupy the positions originally occupied by discs 1–5. New discs 10–13 are added to occupy the positions previously held by discs 6–9. The new discs 10–13 will have wear allowances similar to the original discs 6–9, thus re-establishing the initial condition of the brake. It will be noted that the special wear allowances for discs 1–5 apply only to the original brake fitted to the aircraft, subsequent disc replacements always, in this example, entail the insertion of a standard pack of four discs similar to the original discs 6–9. It should be noted that in order to maintain the torque-carrying capacity of discs 5, s + t should not be less than d.

In the example described above the 'group' of discs for replacement comprises four discs : in other examples the number of discs for removal as a group may be different.

In an alternative example involving a 7-disc brake sets of three discs at each end will be provided with different wear allowances (considering the sets as a whole), and a group of four discs may be replaced at each service.

The construction and maintenance schedule of the brake described above provides a light and compact brake having a good wear life between service intervals.

Figure 3:
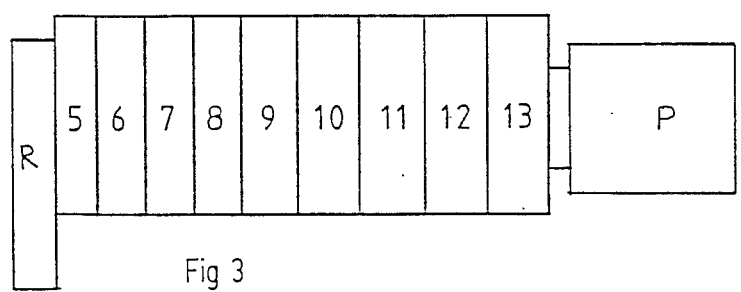
FIG. 3 is a similar view to FIG. 1 showing the brake re-assembled following the service operation with worn discs removed and new discs inserted.

A further important advantage of the brake in accordance with the invention is that where adjacent discs have been run initially with their wear surfaces in mutual engagement these discs are retained in contact throughout the full service lives of these discs. The importance of this feature stems from the wear patterns which the mutually engaging surfaces develop during service such patterns on each disc conform to those of the mating disc, and it is highly advantageous to retain them as a 'friction pair', giving better frictional characteristics than would be obtained by mating a worn surface with that of a new disc. (In the example described, the surfaces of discs 9 and 10 which make contact as shown in FIG. 3 are both initially unworn surfaces).

What we claim is:

1. A method of carrying out the maintenance of a multi-disc brake of the kind comprising a stack of interleaved rotor and stator discs provided between a thrust device and a reaction member in an arrangement in which friction is generated between rubbing faces of adjacent rotor and stator discs, said method comprising:

selecting and arranging the rotor and stator discs so that the wear allowance of a set of discs at one end of the stack is less than the wear allowance of a set of discs at the other end of the stack;

removing a fully worn group of discs from said one end of the stack during a brake service operation following wear;

axially moving or shifting the remaining partially worn discs of the stack to a new position towards said one end of the stack, and adding an unworn group of discs to the other end of the stack.

2. A method according to claim 1 wherein when removing worn discs the remaining discs in the stack are maintained in a mutual relationship so that mating faces of adjacent partly-worn discs remain in their original mating relationship throughout their entire wear lives.

3. A method according to claim 1 wherein the thicknesses of the respective discs are selected such as to provide appropriate wear allowances in accordance with the position to be occupied by the discs during their wear lives.

4. A method according to claim 3 wherein the stack comprises nine discs and the wear allowances of the respective discs are such as to enable the brake discs to be replaced in groups of four discs.

5. A method according to claim 4 wherein the stack comprises seven discs and the wear allowances of the respective discs are such as to enable the brake discs to be replaced in groups of four discs.

6. A method according to claim 1 and comprising providing discs of a kind in which the friction surfaces of the discs and their structural integrity are provided by carbon-carbon composite material.

* * * * *